(12) United States Patent
Dornen et al.

(10) Patent No.: US 11,913,526 B2
(45) Date of Patent: Feb. 27, 2024

(54) SPINDLE ROD FOR A SPINDLE DEVICE AND METHOD FOR MANUFACTURING A SPINDLE ROD FOR A SPINDLE DEVICE

(71) Applicant: Edscha Engineering GmbH, Remscheid (DE)

(72) Inventors: Jorg Dornen, Remscheid (DE); Peter Mrowka, Remscheid (DE); Christian Bartschies, Remscheid (DE); Jochen Bals, Remscheid (DE)

(73) Assignee: EDSCHA ENGINEERING GMBH, Remscheid (DE)

( * ) Notice: Subject to any disclaimer, the term of this patent is extended or adjusted under 35 U.S.C. 154(b) by 0 days.

(21) Appl. No.: 17/556,484

(22) Filed: Dec. 20, 2021

(65) Prior Publication Data
US 2022/0196125 A1    Jun. 23, 2022

(30) Foreign Application Priority Data
Dec. 18, 2020 (DE) .................... 10 2020 134 289.6

(51) Int. Cl.
*F16H 25/20* (2006.01)
*E05F 15/622* (2015.01)

(52) U.S. Cl.
CPC ..... *F16H 25/2015* (2013.01); *F16H 25/2021* (2013.01); *E05F 15/622* (2015.01)

(58) Field of Classification Search
CPC .. F16C 3/023; F16H 25/2021; F16H 25/2015; E05F 15/622
See application file for complete search history.

(56) References Cited

U.S. PATENT DOCUMENTS

| | | | | |
|---|---|---|---|---|
| 3,682,283 A | * | 8/1972 | Sato .................... | F16H 25/2021 192/142 R |
| 4,325,535 A | * | 4/1982 | Foster ................. | F16H 25/2204 92/33 |
| 6,036,077 A | * | 3/2000 | Kingston ............. | B23K 20/129 74/432 |
| 8,297,142 B2 | * | 10/2012 | Kawada ................. | F16H 25/20 74/473.12 |
| 8,601,891 B2 | | 12/2013 | Bochen et al. | |
| 8,800,341 B2 | * | 8/2014 | Osterlanger .......... | F16D 65/567 29/898.063 |
| 10,228,047 B2 | * | 3/2019 | Nunez ..................... | F16H 25/20 |
| 10,641,028 B2 | * | 5/2020 | Takizawa ................. | F16J 15/10 |
| 10,763,061 B2 | * | 9/2020 | Boehm ................... | H01H 11/00 |

(Continued)

FOREIGN PATENT DOCUMENTS

| | | |
|---|---|---|
| DE | 40 22 303 A1 | 1/1992 |
| DE | 10 2008 014 994 A1 | 9/2009 |

(Continued)

*Primary Examiner* — Gregory Robert Weber
(74) *Attorney, Agent, or Firm* — Davidson, Davidson & Kappel, LLC

(57) ABSTRACT

A spindle rod for a spindle device includes a threaded rod (2) with a threaded portion (3) extending along a spindle axis (S) and a coupling part (7) for coupling the threaded rod (2) to a drive or a gear of a drive device. The coupling part (7) is integrally connected to a first end (2*a*) of the threaded rod (2). The coupling part (7) has a connecting portion (7*a*) provided for connecting the threaded rod (2) at a first end (2*a*) facing the threaded rod. The connecting portion (7*a*) has a bead-shaped thickening.

8 Claims, 2 Drawing Sheets

(56) References Cited

U.S. PATENT DOCUMENTS

| | | | | |
|---|---|---|---|---|
| 11,506,267 B2* | 11/2022 | Peric | ............... | F16H 25/2015 |
| 11,519,484 B2* | 12/2022 | Schuetz | ............... | B60T 13/745 |
| 2012/0137803 A1 | 6/2012 | Bochen et al. | | |
| 2019/0185048 A1* | 6/2019 | Carlini | ............... | F16C 3/023 |
| 2020/0049238 A1 | 2/2020 | Peric et al. | | |

FOREIGN PATENT DOCUMENTS

| | | | | |
|---|---|---|---|---|
| DE | 102008014994 A1 * | 9/2009 | ............ | B23K 20/00 |
| DE | 10 2010 053 226 A1 | 6/2012 | | |
| DE | 102011075889 A1 * | 11/2012 | ........... | B23K 20/129 |
| EP | 3 608 557 A1 | 2/2020 | | |

\* cited by examiner

SPINDLE ROD FOR A SPINDLE DEVICE AND METHOD FOR MANUFACTURING A SPINDLE ROD FOR A SPINDLE DEVICE

The present disclosure relates to a spindle rod and a method for manufacturing a spindle rod for a spindle device.

BACKGROUND

From practice spindle devices are known that comprise a spindle rod with an external thread and a spindle nut, wherein the spindle nut is in threaded engagement with the external thread of the spindle rod and thus, by rotating the spindle rod, an axial displacement of the spindle nut along a spindle axis defined by the spindle rod occurs. Such spindle devices are used, in particular, in drive devices designed as a spindle drive for vehicle flaps, wherein said drive devices usually comprise a first housing part and a second housing part, the first housing part being connected to a fixed body part and the second housing part being connected to a vehicle flap. The first housing part is coupled to the spindle rod and the second housing part to the spindle nut so that a linear displacement of the first housing part relative to the second housing part is possible via the spindle device by rotating the spindle rod and linearly displacing the spindle nut. To drive the rotational movement of the spindle rod, a drive is provided, which usually consists of an electric drive motor and a downstream gear arrangement, wherein the spindle rod is non-rotatably coupled to an output shaft of the gear arrangement or optionally directly to an output shaft of the drive motor. The disadvantage of such spindle devices is that the spindle rod has to be extensively reworked at the end provided to be coupled to the gear arrangement, for example, by a corresponding creation of a serration or the like.

DE 10 2010 053 226 A1 discloses a spindle device with a spindle rod, wherein the spindle rod has an external thread and wherein a spindle nut is rotatably in threaded engagement with an external thread of the spindle rod. The spindle device is arranged in a drive device designed as a spindle drive wherein the drive device comprises a drive motor and a gear. The spindle rod rotatably mounted in a housing of the drive device via a spindle bearing is connected to the drive device for a torque transmission via an overload protection device formed by a coupling device wherein the coupling device comprises an inner part, a damping element, an intermediate part, a spring ring and an outer part. For the torque transmission, a gear output shaft of the transmission is pluggably connected to the inner part by means of a form-fitting or force-fitting connection, for example, a serration. The outer part of the coupling device is connected to the spindle rod in the axial direction via a rivet connection. The disadvantage of the spindle device shown is that one end of the spindle rod, which is connected to the coupling device, is secured axially via a rivet connection, which requires additional material to create the connection, and in addition, a serration is disadvantageously required in the spindle device shown in order to ensure the torque transmission. Accordingly, a machining process is required in which material is wasted.

SUMMARY

It is an object of the present disclosure to provide a spindle rod or a spindle device for a drive device which can be manufactured inexpensively and flexibly and which is designed to be space-saving. Another object of the present disclosure is to provide a method for manufacturing a spindle device which is flexible, reliable and inexpensive.

According to one aspect of the present disclosure, a spindle rod for a spindle device that comprises a threaded rod with a threaded portion extending along a spindle axis and a coupling part for coupling the threaded rod to a drive or a gear of a drive device is created. The spindle rod according to the present disclosure is characterized in that the coupling part is integrally connected to a first axial end of the threaded rod. It is thus advantageously possible to manufacture the spindle rod in a particularly cost-effective manner since a coupling portion of the threaded rod can be manufactured separately and can then be connected to the threaded rod at a later date to form the spindle rod. The integral connection between the threaded rod and the coupling part advantageously ensures that the spindle rod can be flexibly adapted to a predetermined connection point of a drive device while, at the same time, ensuring that a reliable coupling of the spindle rod to a gear or a drive motor of a drive device can be established during operation.

The coupling part is particularly preferably designed as a cold extrusion part made of metal or a metal alloy. Particularly preferably, the coupling part is made of at least either aluminum or copper. The coupling part can generally be made both from a pure metal and from a metal alloy. The coupling part can advantageously be manufactured in large numbers in a particularly cost-effective manner. It is furthermore advantageous that the production of the coupling part by cold forming results in an improved rigidity and dimensional accuracy of the coupling part. In spindle rods used for drive devices known from the prior art, the spindle rod is usually manufactured in one piece, and the corresponding end portion, which is provided for coupling the threaded spindle to a gear or a drive of the drive device, is machined by machining processes such as turning or milling. Compared to spindle rods of this type, a spindle rod with a coupling part designed as a cold extrusion part has the particular advantage that both the machining time for the production of the spindle rod is shorter and, moreover, material can advantageously be saved since material is not wasted due to the machining that is not required. The diameter of the threaded rod can furthermore advantageously be reduced since the first end of the threaded rod no longer has to be subsequently processed by machining processes.

In a particularly preferred development, it is provided that the coupling part is connected to the first end of the threaded rod by welding, preferably by friction welding. The coupling part can thus advantageously be connected to the first end of the threaded rod in a reliable and cost-effective manner. In particular, when using friction welding, a particularly firm connection is established between the threaded rod and the coupling part since most of the cross section between the coupling part and the threaded rod is connected over a large area. Furthermore, no foreign substances are necessary, as would be the case, for example, if establishing a connection via an adhesive. It is particularly advantageous to connect different materials by means of friction welding so that the choice of materials used for both the threaded rod and the coupling part is flexible.

In an expedient embodiment, the coupling part has a connection portion provided for the connection to the threaded rod at a first end facing the threaded rod. The connecting portion preferably has a bead-shaped thickening. A radially circumferential groove is expediently limited on one side by the thickening, with the groove being particularly suitable for receiving a bearing element.

According to a further aspect of the present disclosure, a spindle device comprising a threaded rod with a threaded portion extending along a spindle axis is provided. The spindle device further comprises a spindle nut, wherein the spindle nut is in threaded engagement with the threaded portion of the threaded rod. The spindle device further comprises a bearing device for the rotatable mounting of the threaded rod. In addition, the spindle device comprises a coupling part for coupling the threaded rod to a drive or a gear of a drive device. The spindle device according to the present disclosure is characterized in that the coupling part is integrally connected to a first axial end of the threaded rod to form a spindle rod.

A stop part is preferably arranged at a second end of the threaded rod opposite the first end. The stop part substantially serves to limit the axial displacement of the spindle nut on the threaded rod in the direction of the second end of the threaded rod, which is caused when the threaded rod is rotated.

In an expedient development, it is provided that the stop part is connected to the second end of the threaded rod by a weld, in particular a friction weld. This way, during the production of the spindle device, both the coupling part and the stop part can advantageously be connected to the threaded rod at the same time during a single machining step.

The bearing device expediently comprises a bearing element. In a particularly preferred development, the bearing element radially revolves around the coupling part and is secured axially on the coupling part. It is advantageously possible to connect the bearing device to the coupling part or to secure the bearing device axially via the connection between the coupling part and the first end of the threaded rod. As an alternative, however, it can also be provided that the bearing element is axially secured on the threaded rod.

According to a further aspect of the present disclosure, a method for manufacturing a spindle rod for a spindle device is provided. The method comprises providing a threaded rod with a threaded portion extending along a spindle axis and providing a coupling part for coupling the threaded rod to a drive of a drive device. The method further comprises concentrically aligning the coupling part with respect to the spindle axis defined by the threaded rod. The method further comprises friction-welding the coupling part to a first end of the threaded rod. Advantageously, a spindle rod that is rotationally symmetrical to the spindle axis can be manufactured. It is made in two parts and can be flexibly and reliably coupled to an output shaft of a gear or a drive motor of the drive device by selecting the coupling part according to the geometric specifications in a drive device.

In a particularly preferred embodiment of the method for manufacturing a spindle rod, it is provided that the coupling part is manufactured from a piece made of metal or a metal alloy by cold forming before said coupling part is provided. Coupling parts can thus advantageously be manufactured in large numbers without wasting any material. In a further advantageous manner, the coupling part manufactured in this way from different metals or metal alloys and the threaded rod can be reliably joined together to form a spindle rod during the friction welding process step.

In an expedient embodiment of the method for manufacturing a spindle rod, it is provided that a stop part is integrally connected by friction welding to a second end opposite the first end of the threaded rod. It is particularly preferred that the friction welding of the coupling part to the first end of the threaded rod and the friction welding of the stop part to the second end of the threaded rod take place simultaneously or at least immediately one after the other.

Further advantages, developments and characteristics of the present disclosure can be found in the following description of a preferred embodiment.

BRIEF SUMMARY OF THE DRAWINGS

The present disclosure will be explained in more detail below with reference to the accompanying drawings based on a preferred embodiment of the present disclosure.

DETAILED DESCRIPTION

Figure 1:
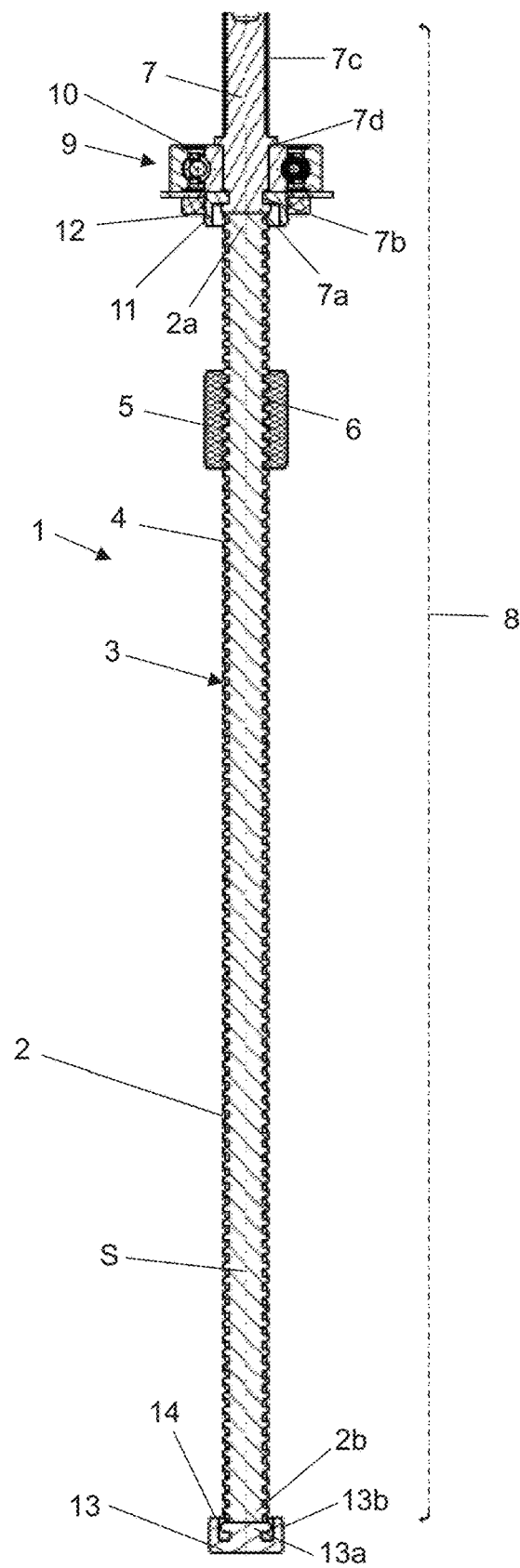
FIG. 1 is an illustration of a preferred embodiment of a spindle device according to the present disclosure with a spindle rod according to the present disclosure in a cross-sectional view.

FIG. 1 depicts a preferred embodiment of a spindle device 1 according to the present disclosure in a cross-sectional view. The spindle device 1 comprises a threaded rod 2 with a threaded portion 3 in which an external thread 4 is provided. In the exemplary embodiment shown here, the external thread 4 of the threaded portion 3 extends along a spindle axis S defined by the threaded rod 2 over the entire length of the threaded rod 2. Such threaded rods can advantageously be manufactured in excess length and shortened to the required length.

The spindle device 1 further comprises a spindle nut 5 with an internal thread 6, the internal thread 6 meshing with the external thread 4 of the threaded rod 2. The spindle nut 5 is accordingly advantageously in threaded engagement with the threaded rod 2 so that the spindle nut 5 can be axially displaced along the spindle axis S by rotating the threaded rod 2. The spindle device is advantageously suitable for use in a drive device for generating a linear drive movement.

A coupling part 7 is arranged at a first end 2a of the threaded rod 2. The coupling part 7 is designed as a cold extrusion part and has a connecting portion 7a which faces the first end 2a of the threaded rod 2 and which is designed as a thickening. The thickened connecting portion 7a delimits an annular groove 7b. The coupling part 7 is advantageously arranged rotationally symmetrical on the spindle axis S at the first end 2a of the threaded rod 2 so that the coupling part 7 is designed as an axial extension of the threaded rod 2. The coupling part 7 is particularly advantageously provided such that the threaded rod 2 can be coupled to an output shaft of a drive or a gear of a drive device.

The coupling part 7 is integrally connected to the first end 2a of the threaded rod 2 at the connecting portion 7 via a friction weld. The connecting portion 7a is advantageously designed as a weld bead that forms during the welding process. The coupling part 7, together with the threaded rod 2, thus forms a spindle rod 8 according to the present disclosure, which is designed to be rotationally driven by an output shaft of a drive device. For this purpose, the coupling part 7 has, at the end facing away from the threaded rod 2, a serration 7c, which is designed as a drive device for the rotationally locked connection to an output shaft. This way, a connection of the spindle rod 8 to an output shaft of a drive device can advantageously be established.

The spindle device 1 further comprises a bearing device 9 with an annular bearing element 10 designed as a ball bearing. The bearing element 10 revolves radially around the coupling part 7 and is axially secured to the coupling part 7 by the bearing element 10 being clamped between an elastic sealing element 11 and an annular projection 7d protruding radially from an outer circumference of the coupling part 7. The sealing element 11 is axially arranged between the bearing element 10 and the connecting portion 7a at the end of the coupling part 7 facing the threaded rod 2. The sealing element 11 is annular and is pressed into the groove 7b provided on the coupling part 7. The groove 7b is created by the friction welding since the friction welding creates the connecting portion 7a, which is designed as a weld bead and delimits the groove 7b on one side. The sealing element 11 can advantageously first be slipped onto the end of the coupling part 7 provided for the connection to the threaded rod 2 and then axially secured by the friction weld. To further secure the bearing element 10, an annular securing element 12 is pushed onto the sealing element 11.

At a second end 2b of the threaded rod 2 opposite the first end 2a, a stop part 13 is arranged, which serves to limit the axial displacement of the spindle nut 5. The stop part 13, like the coupling part 7, is connected to the second end 2b of the threaded rod 2 by friction welding. The stop part 13 has a central connecting portion 13a and a wall portion 13b which revolves radially around the connecting portion 13a.

The stop part 13, like the coupling part 7, is advantageously concentrically arranged about the spindle axis S so that an annular stop surface 14 is present, which is formed by an end face of the hollow cylindrical wall portion 13b facing the threaded rod 2. The central connecting portion 13a is also arranged concentrically to the spindle axis S and is T-shaped in a cross section due to the welding bead formed by friction welding. The connecting portion 13a serves to connect the stop part 13 to the second end 2b of the threaded rod 2.

Since the coupling part 7 and the stop part 13 are arranged opposite one another at the first end 2a and the second end 2b of the threaded rod 2 and both are connected to the threaded rod 2 by friction welding, it is advantageously possible to integrally connect the coupling part 7 and the stop part 13 to the treaded rod 2 in a single manufacturing step by friction welding. For this purpose, the coupling part 7 and the stop part 13 are initially aligned concentrically with respect to the spindle axis S and then moved axially in the direction of the first end 2a and the second end 2b of the threaded rod 2 with a relative rotary movement about the spindle axis S and thus simultaneously connected to the threaded rod 2 by friction welding. The production process is advantageously designed to be particularly time-saving and material-saving.

Figure 2:
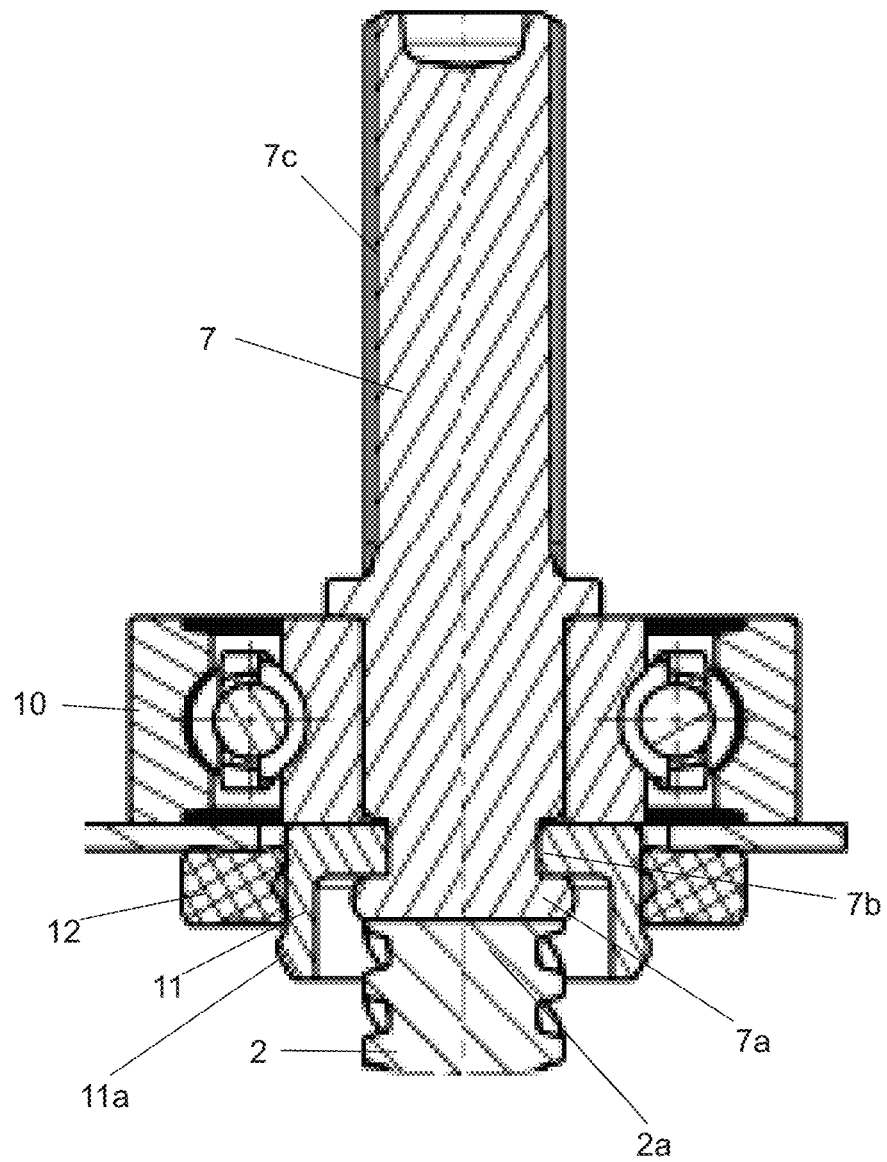
FIG. 2 provides an enlarged view of the spindle device from FIG. 1 in the region of the coupling part.

FIG. 2 shows an enlarged view of the spindle device from FIG. 1 in the region of the coupling part 7. In this view, it can clearly be seen that the connecting portion 7a is designed as a weld bead, which was created by friction welding when the coupling part 7 was connected to the first end 2a of the threaded rod 2. It can also be seen that the sealing element 11 is pressed into the groove 7b delimited on one side by the connecting portion and is correspondingly axially secured. The securing element 12 is pushed onto the sealing element 11 and axially secured by a collar 11a of the sealing element protruding radially outward.

The present disclosure was explained above on the basis of an embodiment in which the bearing element 10 is axially secured on the coupling part 7. It goes without saying that the bearing element can also be arranged and secured on the threaded rod.

What is claimed is:

1. A spindle rod for a spindle device, comprising:
a threaded rod with a threaded portion extending along a spindle axis and
a coupling part for coupling the threaded rod to a drive or a gear of a drive device,
wherein the coupling part is a cold extrusion part made of a metal or metal alloy,
wherein the coupling part is integrally connected to a first end of the threaded rod,
wherein the coupling part is connected to the first end of the threaded rod by welding,
wherein the welding is friction welding,
wherein the coupling part has a connecting portion provided for connecting the threaded rod at a first end facing the threaded rod,
wherein the connecting portion has a bead-shaped thickening,
wherein a radially circumferential groove is limited in one side by the bead-shaped thickening,
wherein an elastic sealing element is pressed into the circumferential groove delimited on one side by the connecting portion,
wherein the bead-shaped thickening is arranged between the groove and the first end of the threaded rod, and
wherein the bead-shaped thickening is a weld bead.

2. The spindle rod according to claim 1,
wherein a bearing device for the rotatable mounting of the threaded rod, comprising a bearing element, is axially secured on the coupling part with the bearing element radially revolving around the coupling part.

3. The spindle rod according to claim 2,
wherein the bearing element is axially secured to the coupling part by the bearing element being clamped between the elastic sealing element and an annular projection protruding radially from an outer circumference of the coupling part.

4. A spindle device for a drive device, comprising:
a spindle rod with a threaded rod with a threaded portion extending along a spindle axis,
a spindle nut, wherein the spindle nut is in threaded engagement with the threaded portion of the threaded rod,
a bearing device configured for rotatable mounting of the threaded rod, a coupling part for coupling the threaded rod to a drive or a gear of the drive device,
wherein the bearing device comprises a bearing element with the bearing element radially revolving around the coupling part and being axially secured on the coupling part,
wherein the coupling part is integrally connected to a first axial end of the threaded rod to form a spindle rod that is rotatably mounted via the bearing device,
wherein the coupling part has a connecting portion provided for connecting the threaded rod at a first end facing the threaded rod,
wherein the bearing element is axially secured to the coupling part by the bearing element being clamped between an elastic sealing element and an annular projection protruding radially from an outer circumference of the coupling part, and
wherein the elastic sealing element is axially arranged between the bearing element and the connecting portion at the first end of the coupling part facing the threaded rod.

5. The spindle device according to claim 4, further comprising a stop part arranged at a second axial end of the threaded rod opposite the first axial end.

6. The spindle device according to claim 5, wherein the stop part is connected to the second end of the threaded rod by a weld.

7. The spindle device according to claim 6, wherein the weld is a friction weld.

8. The spindle device according to claim 7,
wherein the stop part and the coupling part are concentrically aligned to the spindle axis defined by the threaded rod.

\* \* \* \* \*